United States Patent
Sangaru et al.

(10) Patent No.: US 11,060,015 B2
(45) Date of Patent: Jul. 13, 2021

(54) HYDROPHOBIZED NANOPARTICLES AS BREAKER FOR VISCOELASTIC SURFACTANT GELLED FLUIDS

(71) Applicants: Shiv Shankar Sangaru, Al-Khobar (SA); Prahlad Yadav, Jabalpur (IN); Tianping Huang, Spring, TX (US); Gaurav Agrawal, Dammam (SA); Pranjal Sarmah, Al-Khobar (SA)

(72) Inventors: Shiv Shankar Sangaru, Al-Khobar (SA); Prahlad Yadav, Jabalpur (IN); Tianping Huang, Spring, TX (US); Gaurav Agrawal, Dammam (SA); Pranjal Sarmah, Al-Khobar (SA)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/358,980

(22) Filed: Mar. 20, 2019

(65) Prior Publication Data

US 2019/0211254 A1 Jul. 11, 2019

Related U.S. Application Data (62) Division of application No. 15/186,804, filed on Jun. 20, 2016, now Pat. No. 10,280,361.

(51) Int. Cl.
| | |
|---|---|
| *C09K 8/68* | (2006.01) |
| *E21B 43/26* | (2006.01) |
| *C09K 8/60* | (2006.01) |
| *C09K 8/575* | (2006.01) |

(Continued)

(52) U.S. Cl.
CPC .............. *C09K 8/602* (2013.01); *C09K 8/575* (2013.01); *C09K 8/68* (2013.01); *E21B 43/04* (2013.01); *E21B 43/26* (2013.01); *E21B 43/267* (2013.01); *C09K 2208/10* (2013.01); *C09K 2208/26* (2013.01); *C09K 2208/30* (2013.01)

(58) Field of Classification Search
CPC ........ C09K 8/68; C09K 8/80; C09K 2208/30; C09K 2208/10; C09K 8/602; C09K 2208/26; E21B 43/267; E21B 43/26
See application file for complete search history.

(56) References Cited

U.S. PATENT DOCUMENTS

| | | |
|---|---|---|
| 7,033,975 B2 | 4/2006 | Baran, Jr. et al. |
| 7,081,439 B2 | 7/2006 | Sullivan et al. |
| 7,279,446 B2 | 10/2007 | Colaco et al. |

(Continued)

FOREIGN PATENT DOCUMENTS

WO 2008106695 A2 9/2008

OTHER PUBLICATIONS

European Search Report for European Application No. 17816041.2 dated Nov. 28, 2019, 10 pages.

(Continued)

*Primary Examiner* — Catherine Loikith
(74) *Attorney, Agent, or Firm* — Cantor Colburn LLP (57) ABSTRACT

A treatment fluid comprises: a base fluid; a viscoelastic surfactant gelling agent and hydrophobic nanoparticles comprising metallic nanoparticles that are surface modified with $C_{6-30}$ aliphatic groups. The treatment fluid is a fracturing fluid, a completion fluid, a gravel pack fluid, a fluid loss pill, a lost circulation pill, a diverter fluid, a foamed fluid, a stimulation fluid and the like.

15 Claims, 3 Drawing Sheets

(51) Int. Cl.
*E21B 43/04* (2006.01)
*E21B 43/267* (2006.01)

(56) References Cited

U.S. PATENT DOCUMENTS

| | | | |
|---|---|---|---|
| 7,967,068 | B2 | 6/2011 | Huang et al. |
| 8,715,739 | B2* | 5/2014 | Lee .................... B01J 2/06 |
| | | | 424/490 |
| 8,778,852 | B2 | 7/2014 | Huang |
| 2006/0041028 | A1 | 2/2006 | Crews |
| 2008/0149334 | A1 | 6/2008 | Huang et al. |
| 2008/0271888 | A1 | 11/2008 | Huang et al. |
| 2009/0272534 | A1 | 11/2009 | Huang et al. |
| 2012/0048548 | A1 | 3/2012 | Crews et al. |
| 2012/0322700 | A1 | 12/2012 | Crews et al. |
| 2013/0190215 | A1 | 7/2013 | Huang |
| 2014/0076572 | A1 | 3/2014 | Gadberry et al. |
| 2017/0362495 | A1 | 12/2017 | Sangaru et al. |
| 2020/0231867 | A1* | 7/2020 | Bestaoui-Spurr ...... C09K 8/805 |

OTHER PUBLICATIONS

International Search Report, International Application No. PCT/US2017/038277, dated Sep. 12, 2017, Korean Intellectual Property Office; International Search Report 7 pages.
International Written Opinion, International Application No. PCT/US2017/038277, dated Sep. 12, 2017, Korean Intellectual Property Office; International Written Opinion 7 pages.
Omeiza, et al. "Viscoelastic Surfactants Application in Hydraulic Fracturing, It's Set Back and Mitigation—An Overview", ARPN Journal of Engineering and Applied Sciences, vol. 9, No. 1, Jan. 2014; 5 pages.
Shiv Shankar et al. "SPE-188050-MS Surface Modified Nanoparticles as Internal Breakers for Viscoelastic Surfactant Based Fracturing Fluids for High Temperature Operations", Apr. 27, 2017, 7 pages.

* cited by examiner

HYDROPHOBIZED NANOPARTICLES AS BREAKER FOR VISCOELASTIC SURFACTANT GELLED FLUIDS

CROSS REFERENCE TO RELATED APPLICATIONS

This application is a divisional of U.S. application Ser. No. 15/186,804, filed Jun. 20, 2016, the entire disclosure of which is incorporated herein by reference.

BACKGROUND

Hydraulic fracturing is a stimulation process for creating high-conductivity communication with a large area of a subterranean formation. The process increases the effective wellbore area within the formation so that entrapped oil or gas production can be accelerated. The efficiency of the process is often measured by the total amount of contacted surface area that results from the stimulation treatment.

During hydraulic fracturing, a fracturing fluid is pumped at pressures exceeding the fracture pressure of the targeted reservoir rock in order to create or enlarge fractures within the subterranean formation penetrated by the wellbore. Once the fracture is initiated, subsequent stages of fluid containing chemical agents, as well as proppants, are pumped into the created fracture. The fracture generally continues to grow during pumping and the proppants remain in the fracture in the form of a permeable pack that serves to prop the fracture open. Once the treatment is completed, the fracture closes onto the proppants. The proppants keep the created fracture open, providing a highly conductive pathway for hydrocarbons and/or other formation fluids to flow into the wellbore.

Once the fractures have been created or enlarged, the fracturing fluids can be broken down to minimal viscosity and allowed to flow back before production. The timing of breaking can be important for practical concerns. A subtle balance often has to be struck between the initial viscosity and final viscosity after breaking. If the fracturing fluids break too early, the proppant can separate from the fracturing fluids and settle to the bottom of the fracture before a fracturing treatment is completed. In this situation, the geometry of the fracture and well productivity can be impaired.

Viscoelastic surfactant (VES) based fluids have been widely used in hydraulic fracturing, gravel-packing, and frac-packing applications for more than a decade because the fluids exhibit excellent rheological properties and maintain low damage characteristics for formation and fractures. Although the viscosity of VES fluids may be reduced by contact with hydrocarbons or dilution by formation water, to recover VES based fluids efficiently in a commercial setting, a breaker can be used to break the VES fluids to shorten the time required to clean up a well and to increase early oil/gas production.

Various breakers have been disclosed in the art. Despite all the advances, there remains a need in the art for additional materials that can effectively break VES fluids in a controlled manner.

BRIEF DESCRIPTION

A method of breaking the viscosity of a treatment fluid comprises: adding hydrophobic nanoparticles to a treatment fluid comprising a base fluid and a viscoelastic surfactant gelling agent, the hydrophobic nanoparticles comprising metallic nanoparticles that are surface modified with $C_{6-30}$ aliphatic groups, wherein the hydrophobic nanoparticles are added in an amount effective to decrease the viscosity of the treatment fluid as compared to a treatment fluid absent the hydrophobic nanoparticles.

A method of treating a subterranean formation penetrated by a well comprises: combining a base fluid, a viscoelastic surfactant gelling agent, and hydrophobic nanoparticles to form a treatment fluid, the hydrophobic nanoparticles comprising metallic nanoparticles that are surface modified with $C_{8-30}$ groups; and pumping the treatment fluid into the well.

A treatment fluid comprises a base fluid; a viscoelastic surfactant gelling agent; and hydrophobic nanoparticles comprising metallic nanoparticles that are surface modified with $C_{6-30}$ groups.

BRIEF DESCRIPTION OF THE DRAWINGS

The following descriptions should not be considered limiting in any way. With reference to the accompanying drawings, like elements are numbered alike.

DETAILED DESCRIPTION

The inventors hereof have discovered that hydrophobized nanoparticles, particularly metallic nanoparticles that have been surface modified with long aliphatic chains, can be used as breakers for viscoelastic surfactant based fluids.

As used herein, "hydrophobized" or "hydrophobic" nanoparticles refer to nanoparticles having a surface that is difficult to wet because of its chemical composition and/or geometric microstructure. Hydrophobic nanoparticles as disclosed herein have at least one of the following characteristics: a static contact angle greater than about 120°, greater than about 130°, greater than about 140°, or greater than about 150°; a contact angle hysteresis less than about 30°, less than about 20°, less than about 15°, or less than about 10°; or a roll-off angle less than about 20°, less than about 10°, or less than about 5°. In an embodiment, the hydrophobic nanoparticles have two of these characteristics. In another embodiment, hydrophobic nanoparticles have all three characteristics.

The hydrophobic nanoparticles comprise metallic nanoparticles that are surface modified with a $C_{6-30}$ aliphatic group. In an embodiment, hydrophobic nanoparticles comprise metallic nanoparticles that are surface modified with a $C_{10-28}$ or $C_{12-25}$ aliphatic group. As used herein, "aliphatic group" means a saturated or unsaturated linear or branched hydrocarbon group. A hydrocarbon group refers broadly to a substituent comprising carbon and hydrogen, optionally with 1 to 3 heteroatoms, for example, oxygen, nitrogen, halogen, silicon, sulfur, or a combination thereof. An aliphatic group may be an alkyl, alkenyl, or alkynyl group, for example.

Surface modified means that the aliphatic groups are bonded to the metallic nanoparticles or physically associated with the metallic nanoparticles. In an embodiment, the aliphatic groups are bonded to the surface of the metallic nanoparticles via a functional group, for example a carboxylate group.

The metallic nanoparticles include an alkaline earth metal, alkaline earth metal oxide, alkaline earth metal hydroxide, transition metal, transition metal oxide, transition metal hydroxide, aluminum, aluminum oxide, aluminum hydroxide, or a combination comprising at least one of the foregoing. The transition metal is vanadium, molybdenum, manganese, iron, cobalt, nickel, palladium, copper, zinc, or titanium. The alkaline earth metal can be magnesium, calcium, strontium, and barium. In specific embodiments the metallic nanoparticle comprises magnesium oxide, magnesium hydroxide, calcium oxide, calcium hydroxide, iron oxide, iron hydroxide, copper oxide, zinc oxide, or a combination comprising at least one of the foregoing. In an embodiment, the metallic nanoparticle comprises a transition metal oxide such as zinc oxide.

The metallic nanoparticles have a particle size of less than about 1 micron, less than about 0.5 micron, or less than about 0.1 micron. In an embodiment, metallic nanoparticles have a particle size of about 10 nanometers to about 500 nanometers, about 20 nanometers to about 100 nanometers or about 20 nanometers to about 40 nanometers. As used herein, "size" refers to the largest linear dimension, e.g., a diameter in a spherical particle.

The hydrophobic nanoparticles can be prepared by modifying the surface of the metallic nanoparticles with a modifying agent. Exemplary modifying agents include fatty acids. The fatty acids can be saturated or unsaturated. A mixture of different fatty acids can be used. Exemplary fatty acids include caprylic acid, capric acid, lauric acid, myristic acid, palmitic acid, stearic acid, behenic acid, lignoceric acid, cerotic acid, myristoleic acid, palmitoleic acid, sapienic acid, oleic acid, elaidic acid, vaccenic acid, linoleic acid, arachidonic acid, erucic acid, or a combination comprising at least one of the foregoing. The fatty acids can be derived from plant and animal sources. Stearic acid is specifically mentioned.

Figure 1:
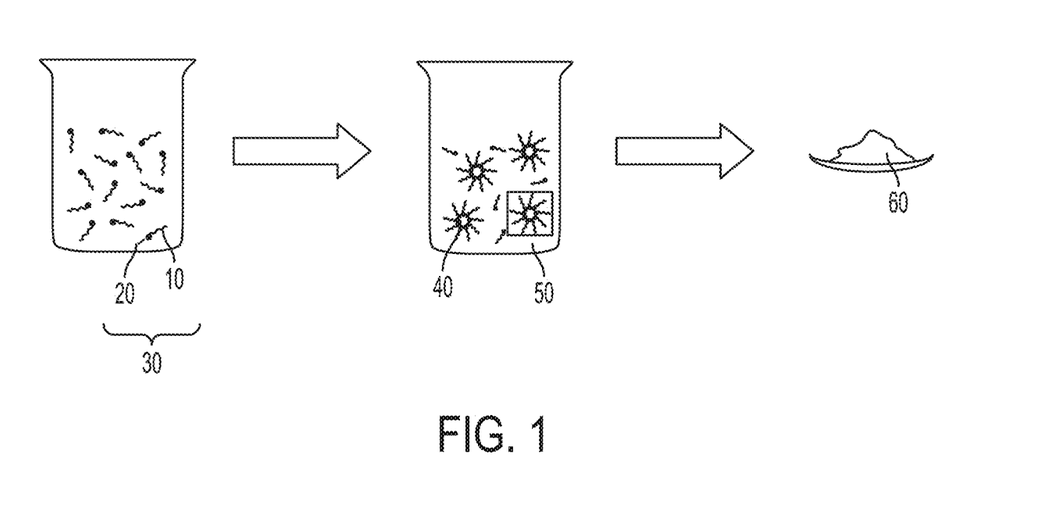
FIG. 1 illustrates a process to prepare hydrophobic nanoparticles according to an embodiment of the disclosure.

An exemplary process to prepare hydrophobic nanoparticles is illustrated in FIG. 1. As shown in FIG. 1, a modifying agent 30 having an aliphatic tail 10 and a head 20 is dissolved in a solvent. The tail can contain a $C_{6-30}$ or $C_{12-25}$ aliphatic group. The head can contain a functional group such as a carboxylic acid group. To the solution of modifying agent 30 was added metallic nanoparticle 40. The metallic nanoparticles can be added in a powder form. Alternatively, the metallic nanoparticles can be first dissolved or dispersed in a solvent to form a solution or dispersion, then the solution or dispersion is added to the modifying agent. The order of addition is not particularly limited. A modifying agent can also be added to metallic nanoparticles.

After the modifying agent is combined with metallic nanoparticles in the presence of a solvent, the mixture is mixed for a sufficient amount of time such that the head of the modifying agent bonded or attached to the surface of the metallic nanoparticles forming hydrophobic nanoparticles 50. After the reaction is completed, the mixture is filtered, and the precipitate is washed with a solvent to remove unreacted modifying agent or other impurities. The washed precipitate can be dried in an oven or using other conventional means to provide hydrophobic nanoparticle powder 60.

The hydrophobic nanoparticles have a particle size of less than about 1 micron, less than about 0.5 micron, or less than about 0.1 micron. In an embodiment, hydrophobic nanoparticles have a particle size of about 10 nanometers to about 500 nanometers, about 20 nanometers to about 100 nanometers or about 20 nanometers to about 40 nanometers.

The hydrophobic nanoparticles can be added to a VES based treatment fluid in an amount effective to decrease its viscosity as compared to a VES based treatment fluid absent the hydrophobic nanoparticles. In an embodiment, the amount of the hydrophobic nanoparticles added to a VES based treatment fluid is about 2 pounds to about 50 pounds by weight per one thousand gallons (ppt or pptg) of the treatment fluid. In specific embodiments, the hydrophobic nanoparticles are added in an amount of about 10 pptg to about 40 pptg or about 10 pptg to about 30 pptg.

As used herein, treatment fluids are VES based fluids containing a base fluid and a viscoelastic surfactant (also referred to as "viscoelastic surfactant gelling agent"). The useful viscoelastic surfactants include, but are not necessarily limited to, non-ionic, cationic, amphoteric, and zwitterionic surfactants. These surfactants can be used either alone or in combination with other surfactants to create ordered structures, which result in increased viscosity of aqueous-based fluids. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. When the surfactants are cationic, they are associated with a negative counterion, which can be an inorganic anion such as a sulfate, a nitrate, a perchlorate or a halide such as Cl, Br or with an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactants are anionic, they are associated with a positive counterion, for example, $Na^+$ or $K^+$. When they are zwitternionic, they are associated with both negative and positive counterions, for example, $Cl^-$ and $Na^+$ or $K^+$. Other viscoelastic surfactant has been described in U.S. Pat. Nos. 7,081,439 and 7,279,446. In an embodiment, the viscoelastic surfactants include those described in 20140076572, and can be erucamidopropyl hydroxypropyl sulfobetaine, erucamidopropyl hydroxyethyl sulfobetaine, erucamidopropyl hydroxymethyl sulfobetaine, or a combination comprising at least one of the foregoing. Erucamidopropyl hydroxypropyl sulfobetaine, also known as erucamido hydroxysultaine, is specifically mentioned. The viscoelastic surfactants may be used in conjunction with organic additive such as phthalic acid, salicylic acid or their salts.

The viscoelastic surfactant is present in an amount of about 1 wt. % to about 30 wt. %, about 1 wt. % to about 20 wt. %, or about 2 wt. % to about 15 wt. %, based on the total weight of the treatment fluid.

The base fluid can be aqueous base fluids including water or brine. The brine is, for example, seawater, produced water, completion brine, or a combination thereof. The properties of the brine can depend on the identity and components of the brine. Seawater, as an example, contains numerous constituents such as sulfate, bromine, and trace metals, beyond typical halide-containing salts. In some embodiments, produced water is water extracted from a production reservoir (e.g., hydrocarbon reservoir) or produced from the ground. Produced water also is referred to as reservoir brine and contains components such as barium, strontium, and heavy metals. In addition to the naturally occurring brines (seawater and produced water), completion brine is synthesized from fresh water by addition of various salts such as KCl, NaCl, $ZnCl_2$, $MgCl_2$, or $CaCl_2$ to increase the density of the brine, such as 10.6 pounds per gallon of $CaCl_2$ brine. If desired, the above brines can be further modified to include an additional salt. In an embodiment, the additional salt included in the brine is KBr, NaBr, $CaBr_2$, $ZnBr_2$, $NH_4Cl$, potassium formate, sodium formate, cesium formate, and the like. A calcium salt such as calcium chloride is specifically mentioned. In an example, the salt for example a calcium salt is present in the brine in an amount from about 5 weight percent (wt %) to about 50 wt %, or about 10 weight percent to about 50 wt %, specifically about 15 wt % to about 40 wt %, and more specifically about 25 wt % to about 35 wt %, based on the total weight of the brine.

Water soluble solvents can also be included in the aqueous base fluid. Exemplary water soluble solvents include but are not limited to methanol, ethanol, propanol, butanol, ethylene glycol, propylene glycol, polyethylene glycol, polypropylene glycol, isomers thereof, or a combination comprising at least one of the foregoing.

The treatment fluids can contain one or more additional components depending on the end use of the fluids and their desired properties. Additional optional components include stabilizers, viscosity enhancers, fluid loss control agents, proppants, scale inhibitors, tracers, pH-buffering agents, lubricants, surfactants, a biocides, or breakers other than hydrophobic nanoparticles.

The treatment fluids can have a relatively high viscosity at high temperatures. In an embodiment, the treatment fluids have a viscosity of about 50 to about 350 cP or about 250 to about 350 cP at 300° F. and 100 $s^{-1}$.

The hydrophobic nanoparticles are effective to reduce the viscosity of the treatment fluids in a controlled manner. Advantageously, the viscosity of the treatment fluid with the hydrophobic nanoparticles changes less than about 20% or less than about 15%, or less than about 10% after exposing to an environment having a temperature of about 250° F. to about 350° F. for two hours.

After the treatment fluids have been pumped downhole and at the time to clean up the well, the hydrophobic nanoparticles can reduce the viscosity of the treatment fluid from greater than about 150 cP to less than about 30 cP, each measured at 300° F. and 100 $s^{-1}$. In an embodiment the hydrophobic nanoparticles can reduce the viscosity of the treatment fluid from greater than about 250 cP to less than about 20 cP, each measured at 300° F. and 100 $s^{-1}$. Reducing the viscosity of the treatment fluid can be accomplished in the well, the subterranean formation, or a combination thereof. The break time can range from about 2 hours to about 24 hours, about 2 hours to about 72 hours, or about 2 hours to about 36 hours, or about 2 hours to about 24 hours.

The viscoelastic surfactants are known to form gels due to formation of long wormlike micelles that are entangled with each other. These entangled wormlike micelles that are bound by weak forces behave similar to cross linked polymer gel. An increase in the length of wormlike micelle favors higher viscosity of the fluid. The micelles in aqueous solution are formed by the amphiphilic surfactant molecules that tend to self-assemble such that the hydrophilic group of the molecules is exposed to the water molecules and the hydrophobic part of the molecules are directed away from the water. Depending on the ratio of the hydrophobic and hydrophilic part, the micelles could be of spherical, rod like, elongated wormlike or of lamellar structure.

Without wishing to be bound by theory, it is believed that the hydrophobic nanoparticles when added to a viscoelastic fluid have a tendency to enter into the hydrophobic pockets of the micelle structure. At lower temperature these hydrophobic nanoparticles stabilize the micellar structure and may increase the viscosity of the treatment fluid. However, at higher temperature and with prolonged heating the viscosity of the treatment fluid can decrease. Further without wishing to be bound by theory, it is believed that hydrophobic nanoparticles energetically favor a rearrangement of the micellar structure such that wormlike micelles can breakdown into smaller rod like structures resulting in lower viscosity.

The treatment fluids as described herein have use in fracturing fluids, completion fluids, gravel pack fluids, fluid loss pills, lost circulation pills, diverter fluids, foamed fluids, stimulation fluids and the like. The treatment fluid can be a liquid or a foam, where air, nitrogen, carbon dioxide, natural gas and the like is used for the gas phase. A method of treating a subterranean formation penetrated by a well comprises: forming a treatment fluid; and pumping the treatment fluid into the well.

The treatment fluid can be made in a variety of ways. According to an embodiment, a process for making the treatment fluid includes combining a base fluid, a viscoelastic surfactant gelling agent, and hydrophobic nanoparticles as disclosed herein. Better dispersion can be obtained when the hydrophobic nanoparticles are initially dispersed in a small amount of the viscoelastic surfactant gel and then mixed to a bulk solution. Presence of surfactant molecules in the viscoelastic surfactant gel help in dispersing the hydrophobized nanoparticles into an aqueous media.

Combining the components of the treatment fluid is accomplished in a vessel such as a mixer, blender, and the like. Alternatively or in addition, the fluid is injected without mixing, e.g. it is injected "on the fly". The components are mixed, agitated, stirred, and the like. In an embodiment, the components are combined as the treatment fluid is being disposed downhole.

The treatment fluids can be used in a hydraulic fracturing operation, a frac packing operation, a gravel packing operation, an acidifying operation, a diversion operation, a sand control operation, and the like.

The disclosure will be further described with respect to the following Examples which are not meant to be limiting, but rather to further illustrate the various embodiments.

EXAMPLES

Preparation of Samples

Hydrophobized nanoparticles were synthesized by first dissolving around 3 gm of stearic acid in 100 mL of propanol/hexane. To this solution around 5 gm of ZnO nanoparticles were added and left overnight for stirring. The modified nanoparticles were separated from the mixture by filtration or centrifuging and washed with a solvent. The collected nanoparticles were again dispersed in pure solvent, and the washing was repeated. After three cycles of washing, the collected nanoparticles were dried in oven at 80° C. These nanoparticles were fully hydrophobized (ZnO-StA) and can be used for mixing in the viscoelastic surfactant gel solutions.

A VES base fluid (also referred to as "base fluid") was prepared by taking 600 g of calcium chloride and making it up to 2 L with seawater by continuous dissolution. After mixing for 15 min, the solution was centrifuged at 2,500 rpm for 30 min to remove calcium sulfate precipitates formed with the sulfate ions present in the seawater. To 1810 mL of the above solution 190 mL of GBW-300, a VES surfactant from Baker Hughes Incorporated, was added and mixed in a blender for 15 min at 1,000 rpm to provide a base fluid containing 9 wt. % of the VES surfactant and 30 wt. % of $CaCl_2$ in seawater.

Results and Discussions

Figure 2:
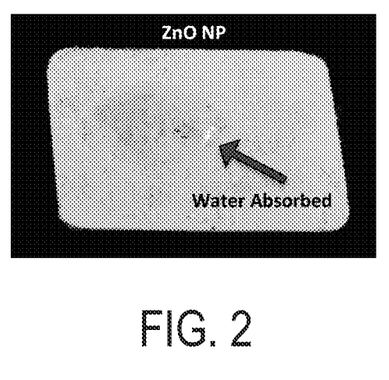
FIG. 2 is a photo showing un-modified zinc oxide nanoparticles treated with a drop of water.
Figure 3:
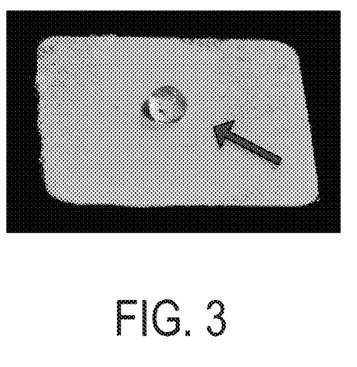
FIG. 3 is a photo showing hydrophobized zinc oxide nanoparticles treated with a drop of water.

The hydrophobicity of the metallic nanoparticles is significant improved after the surface modification. FIG. 2 is a photo showing unmodified zinc oxide nanoparticles treated with a drop of water. FIG. 3 is a photo showing surface modified zinc oxide nanoparticles treated with a drop of water. As shown in these figures, unmodified zinc oxide nanoparticles are hydrophilic. They absorb water and become a paste like material. In contrast, surface modified nanoparticles are very hydrophobic and have a very high contact angle.

Different tests were carried out by varying the amount of hydrophobized nanoparticles in the VES base fluid. The added amount was varied from 12 pptg to 36 pptg. The results are shown in the table below and FIG. 4.

TABLE

| Hydrophobic Nanoparticles (pptg) | Initial viscosity at 300° F. | T1* | T2** |
|---|---|---|---|
| 0 | 300 | — | — |
| 12 | 328 | 8 h 25 m | >24 h |
| 18 | 348 | 6 h 45 m | 20 h 30 m |
| 24 | 322 | 2 h 45 m | 15 h 25 m |
| 30 | 322 | 1 h 55 m | 10 h 14 m |
| 36 | 306 | 1 h 4 m | 11 h |

*T1 represents the time after which the fluid viscosity drops below 300 cP.
**T2 represents the time after which the fluid viscosity drops below 20 cP.

Figure 4:
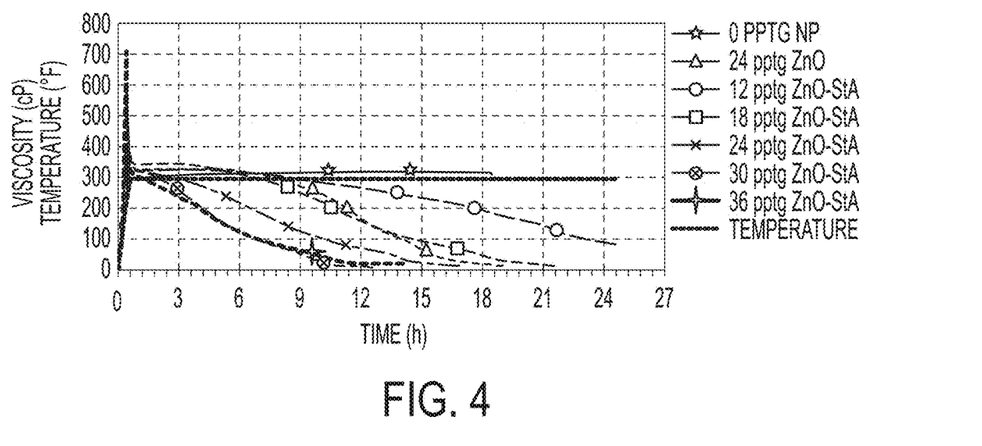
FIG. 4 is a graph showing the viscosity of a base VES fluid without hydrophobic nanoparticles and the viscosity of VES fluids with varying amounts of hydrophobic zinc oxide nanoparticles, as a function of time.

As shown in the Table and FIG. 4, the VES base fluid had a viscosity of around 320 cP at 300° F. The viscosity was stable for more than 18 hours of heating at 300° F. After 12 pptg of hydrophobized nanoparticles were added to the base fluid, initial viscosity after reaching 300° F. was marginally more than that observed with the base fluid. However, the viscosity decreased on prolonged heating at this temperature. After continued heating for about 8 hours 30 minutes at 300° F., the viscosity dropped below 300 cP, and after 20 h the viscosity dropped down to 20 cP. Increasing the amount of hydrophobized nanoparticles reduced the breaking time. Beyond 30 pptg of added hydrophobized nanoparticles no considerable reduction in breaking time was observed. The time required for the fluid viscosity to drop from 300 cP to 20 cP ranged from 13 hours to 8 hours with increasing amount of the hydrophobic nanoparticles.

At lower temperature these hydrophobic nanoparticles seem to stabilize the micellar structure as the viscosity is observed to be marginally increased in their presence. However, at higher temperature and with prolonged heating the viscosity of the gel is observed to decrease. The breaking time can be varied by changing the amount of the added hydrophobic nanoparticles.

Set forth below are various embodiments of the disclosure.

Embodiment 1. A method of breaking the viscosity of a treatment fluid, the method comprising: adding hydrophobic nanoparticles to a treatment fluid comprising a base fluid and a viscoelastic surfactant gelling agent, the hydrophobic nanoparticles comprising metallic nanoparticles that are surface modified with $C_{6-30}$ aliphatic groups, wherein the hydrophobic nanoparticles are added in an amount effective to decrease the viscosity of the treatment fluid as compared to a treatment fluid absent the hydrophobic nanoparticles.

Embodiment 2. The method of Embodiment 1, wherein the hydrophobic nanoparticles have one or more of the following characteristics: a static contact angle greater than about 120°; a contact angle hysteresis less than about 30°; or a roll-off angle less than about 20°.

Embodiment 3. The method of Embodiment 1 or Embodiment 2, wherein the hydrophobic nanoparticles comprise metallic nanoparticles that are surface modified with $C_{8-26}$ alkyl groups.

Embodiment 4. The method of any one of Embodiments 1 to 3, wherein the aliphatic groups are derived from a fatty acid.

Embodiment 5. The method of Embodiment 4, wherein the fatty acid comprises caprylic acid, capric acid, lauric acid, myristic acid, palmitic acid, stearic acid, behenic acid, lignoceric acid, cerotic acid, myristoleic acid, palmitoleic acid, sapienic acid, oleic acid, elaidic acid, vaccenic acid, linoleic acid, arachidonic acid, erucic acid, or a combination comprising at least one of the foregoing.

Embodiment 6. The method of any one of Embodiments 1 to 5, wherein the metallic nanoparticles comprise one or more of the following: an alkaline earth metal; an alkaline earth metal oxide; an alkaline earth metal hydroxide; a transition metal; a transition metal oxide; a transition metal hydroxide; aluminum; aluminum oxide; aluminum hydroxide.

Embodiment 7. The method of Embodiment 6, wherein the metallic nanoparticles comprise zinc oxide, zinc hydroxide, or a combination thereof.

Embodiment 8. The method of any one of Embodiments 1 to 7, wherein the hydrophobic nanoparticles reduces the viscosity of the treatment fluid from greater than about 150 cP to less than about 30 cP, each measured at 300° F. and 100 $s^{-1}$.

Embodiment 9. A method of treating a subterranean formation penetrated by a well, the method comprising: combining a base fluid, a viscoelastic surfactant gelling agent, and hydrophobic nanoparticles to form a treatment fluid, the hydrophobic nanoparticles comprising metallic nanoparticles that are surface modified with $C_{8-30}$ aliphatic groups; and pumping the treatment fluid into the well.

Embodiment 10. The method of Embodiment 9, wherein the hydrophobic nanoparticles have one or more of the following characteristics: a static contact angle greater than about 120°; a contact angle hysteresis less than about 30°; or a roll-off angle less than about 20°.

Embodiment 11. The method of Embodiment 9 or Embodiment 10, wherein the aliphatic groups are derived from a fatty acid.

Embodiment 12. The method of any one of Embodiments 9 to 11, wherein the metallic nanoparticles comprise one or more of the following: an alkaline earth metal; an alkaline earth metal oxide; an alkaline earth metal hydroxide; a transition metal; a transition metal oxide; a transition metal hydroxide; aluminum; aluminum oxide; or aluminum hydroxide.

Embodiment 13. The method of Embodiment 12, wherein the metallic nanoparticles comprise zinc oxide, zinc hydroxide, or a combination thereof.

Embodiment 14. The method of any one of Embodiments 9 to 13, wherein the base fluid is a brine comprising about 2 wt. % to about 50 wt. % of a salt.

Embodiment 15. The method of any one of Embodiments 9 to 14, wherein the amount of the hydrophobic nanoparticles are selected such that the treatment fluid has a viscosity variation of less than about 20% within about 2 hours after the treatment fluid is heated to a temperature of about 300° F.

Embodiment 16. The method of any one of Embodiments 9 to 15, further comprising reducing the viscosity of the treatment fluid to less than about 30 cP in the well, the subterranean formation, or a combination thereof.

Embodiment 17. The method of any one of Embodiments 9 to 16, wherein the hydrophobic nanoparticles are present in an amount of about 2 pptg to about 50 pptg.

Embodiment 18. The method of any one of Embodiments 9 to 17, wherein treating the subterranean formation comprises a hydraulic fracturing operation, a frac packing operation, a gravel packing operation, an acidifying operation, a diversion operation, or a sand control operation.

Embodiment 19. A treatment fluid comprising: a base fluid; a viscoelastic surfactant gelling agent; and hydrophobic nanoparticles comprising metallic nanoparticles that are surface modified with $C_{6-30}$ aliphatic groups.

Embodiment 20. The treatment fluid of Embodiment 19, wherein the aliphatic groups are derived from a fatty acid.

Embodiment 21. The treatment fluid of Embodiment 19 or Embodiment 20, wherein the metallic material comprises one or more of the following: an alkaline earth metal; an alkaline earth metal oxide; an alkaline earth metal hydroxide; a transition metal; a transition metal oxide; a transition metal hydroxide; aluminum; aluminum oxide; or aluminum hydroxide.

Embodiment 22. The treatment fluid of any one of Embodiments 19 to 21, wherein the hydrophobic nanoparticles comprise zinc oxide, zinc hydroxide, or a combination thereof.

Embodiment 23. The treatment fluid of any one of Embodiments 19 to 22, wherein the hydrophobic nanoparticles are present in an amount of about 2 pptg to about 50 pptg; and the viscoelastic surfactant is present in an amount of about 1 wt. % to about 30 wt. %, based on the total weight of the treatment fluid.

All ranges disclosed herein are inclusive of the endpoints, and the endpoints are independently combinable with each other. "Or" means "and/or." As used herein, "combination" is inclusive of blends, mixtures, alloys, reaction products, and the like. "A combination thereof" means "a combination comprising one or more of the listed items and optionally a like item not listed." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A treatment fluid comprising:
a base fluid, which is a brine comprising about 2 wt. % to about 50 wt. % of a salt;
about 1 wt. % to about 30 wt. % of a viscoelastic surfactant gelling agent based on a total weight of the treatment fluid; and
hydrophobic nanoparticles present in an amount of about 2 pptg to about 50 pptg, the hydrophobic nanoparticles comprising metallic nanoparticles that are surface modified with $C_{6-30}$ aliphatic groups derived from a fatty acid comprising caprylic acid, capric acid, lauric acid, myristic acid, palmitic acid, stearic acid, behenic acid, lignoceric acid, cerotic acid, myristoleic acid, palmitoleic acid, sapienic acid, oleic acid, elaidic acid, vaccenic acid, linoleic acid, arachidonic acid, erucic acid, or a combination comprising at least one of the foregoing, the metallic nanoparticles comprising one or more of the following: magnesium oxide, magnesium hydroxide, calcium oxide, calcium hydroxide, iron oxide, iron hydroxide, copper oxide, zinc oxide, or zinc hydroxide;
wherein the treatment fluid is a fracturing fluid, a completion fluid, a gravel pack fluid, a fluid loss pill, a lost circulation pill, a diverter fluid, a foamed fluid, or a stimulation fluid.

2. The treatment fluid of claim 1, wherein the hydrophobic nanoparticles have one or more of the following characteristics: a static contact angle greater than about 120°; a contact angle hysteresis less than about 30°; or a roll-off angle less than about 20°.

3. The treatment fluid of claim 1, wherein the hydrophobic nanoparticles comprise metallic nanoparticles that are surface modified with $C_{8-26}$ alkyl groups.

4. The treatment fluid of claim 1, wherein the hydrophobic nanoparticles comprise zinc oxide, zinc hydroxide, or a combination thereof.

5. The treatment fluid of claim 1, wherein an amount of the hydrophobic nanoparticles is selected such that the treatment fluid has a viscosity variation of less than about 20% within about 2 hours after the treatment fluid is heated to a temperature of about 300° F.

6. The treatment fluid of claim 1, wherein the hydrophobic nanoparticles are present in an amount of about 10 pptg to about 40 pptg.

7. The treatment fluid of claim 1, wherein the viscoelastic surfactant gelling agent is present in an amount of about 2 wt. % to about 15 wt. %, based on a total weight of the treatment fluid.

8. The treatment fluid of claim 1, wherein the viscoelastic surfactant gelling agent is present in an amount of about 2 wt. % to about 20 wt. % based on a total weight of the treatment fluid.

9. The treatment fluid of claim 1, wherein the viscoelastic surfactant gelling agent comprises erucamidopropyl hydroxypropyl sulfobetaine, erucamidopropyl hydroxyethyl sulfobetaine, erucamidopropyl hydroxymethyl sulfobetaine, or a combination comprising at least one of the foregoing.

10. The treatment fluid of claim 1, wherein the base fluid comprises about 15 wt. % to about 40 wt. % of a calcium salt based on a total weight of the base fluid.

11. The treatment fluid of claim 1, wherein the hydrophobic nanoparticles comprising zinc oxide nanoparticles that are surface modified with stearic acid.

12. The treatment fluid of claim 1, wherein the salt comprises one or more of the following: KCl, NaCl, $ZnCl_2$, $MgCl_2$, or $CaCl_2$.

13. A treatment fluid comprising:
a base fluid, which is a brine comprising about 2 wt. % to about 50 wt. % of a salt;
a viscoelastic surfactant gelling agent present in an amount of about 2 wt. % to about 20 wt. % based on a total weight of the treatment fluid, the viscoelastic surfactant gelling agent comprising erucamidopropyl hydroxypropyl sulfobetaine, erucamidopropyl hydroxyethyl sulfobetaine, erucamidopropyl hydroxymethyl sulfobetaine, or a combination comprising at least one of the foregoing; and
hydrophobic nanoparticles comprising metallic nanoparticles that are surface modified with $C_{6-30}$ aliphatic groups derived from a fatty acid comprising caprylic acid, capric acid, lauric acid, myristic acid, palmitic acid, stearic acid, behenic acid, lignoceric acid, cerotic acid, myristoleic acid, palmitoleic acid, sapienic acid, oleic acid, elaidic acid, vaccenic acid, linoleic acid, arachidonic acid, erucic acid, or a combination comprising at least one of the foregoing, the metallic nanoparticles comprising one or more of the following: magnesium oxide, magnesium hydroxide, calcium oxide, calcium hydroxide, iron oxide, iron hydroxide, copper oxide, or zinc oxide, the hydrophobic nanoparticles being present in an amount of about 2 pptg to about 50 pptg.

14. The treatment fluid of claim 13, wherein the base fluid comprises about 15 wt. % to about 40 wt. % of a calcium salt based on a total weight of the base fluid.

15. The treatment fluid of claim 13, wherein the hydrophobic nanoparticles comprising zinc oxide nanoparticles that are surface modified with stearic acid.

* * * * *